United States Patent [19]
Usui et al.

[11] Patent Number: 5,346,675
[45] Date of Patent: Sep. 13, 1994

[54] EXHAUST GAS CLEANING APPARATUS

[75] Inventors: Masayoshi Usui, Numazu; Haruo Serizawa, Shizuoka, both of Japan

[73] Assignee: Usui Kokusai Sangyo Kabushiki Kaisha, Japan

[21] Appl. No.: 449,266

[22] Filed: Dec. 12, 1989

[30] Foreign Application Priority Data

Dec. 16, 1988 [JP] Japan .................. 63-0162402[U]
Dec. 20, 1988 [JP] Japan .................. 63-0164029[U]

[51] Int. Cl.⁵ .................................. F01N 3/10
[52] U.S. Cl. ................... 422/180; 422/171; 422/176; 422/177; 422/179; 422/180; 55/DIG. 30; 55/521; 502/527; 29/890
[58] Field of Search ............... 422/171, 172, 176, 177, 422/179, 180; 55/DIG. 30, 521; 502/527; 29/890, 890.08; 60/299, 301

[56] References Cited

U.S. PATENT DOCUMENTS

| | | | |
|---|---|---|---|
| 3,937,617 | 2/1976 | Yaguchi | 422/179 |
| 4,004,887 | 1/1977 | Stormont | 422/179 |
| 4,186,172 | 1/1980 | Scholz | 422/180 |
| 4,282,186 | 8/1981 | Nonnenmann et al. | 422/180 |
| 4,576,800 | 3/1986 | Retallick | 422/180 |
| 4,617,176 | 10/1986 | Merry | 422/179 |
| 4,795,615 | 1/1989 | Cyron et al. | 422/179 |
| 4,909,994 | 3/1990 | Nishizawa et al. | 422/190 X |
| 4,942,020 | 7/1990 | Whittenberger et al. | 422/180 |

Primary Examiner—David A. Redding
Attorney, Agent, or Firm—Lowe, Price, LeBlanc & Becker

[57] ABSTRACT

An exhaust gas cleaning apparatus comprises one or more honeycomb core bodies for carrying an exhaust gas cleaning catalyst and fitted in a tubular metal casing. The metal casing has an outer wall which is axially expandable and contractible so as to follow the stress due to thermal strains acting on the honeycomb core bodies inside, thereby remarkably improving the apparatus in durability and vibration resistance.

22 Claims, 3 Drawing Sheets

EXHAUST GAS CLEANING APPARATUS

BACKGROUND OF THE INVENTION

1. Field of the Invention

This invention relates to an exhaust gas cleaning apparatus which is generally provided at a midpoint of an exhaust system of an automobile and which is composed of a metal-made honeycomb core body adapted for carrying thereon an exhaust gas cleaning catalyst and fitted in a tubular metal casing. More particularly, the invention relates to an exhaust gas cleaning apparatus in which the constituent members of the apparatus are joined with adequate strength so as to resist against separation, cracking and other breakage due to thermal strains.

2. Description of the Related Art

In conventional exhaust gas cleaning apparatuses of the mentioned type, a sheet-like band made of a heat-resistant thin metal sheet and a corrugated band made from another thin metal sheet of the same kind are superposed one over the other to have areas of contact therebetween. They are then rolled together spirally into a honeycomb form (hereinafter called "honeycomb core body") defining many network-patterned gas flow passages along the central axis thereof for allowing exhaust gas to pass therethrough. The honeycomb core body is enclosed by a tubular metal casing which has a single-layer body and opens at opposite ends thereof. The honeycomb core body and the tubular metal casing are firmly joined by brazing, for example, so as to resist against the stress due to thermal strains resulting from the high temperature of exhaust gas as well as the exothermic reaction between exhaust gas and the exhaust gas cleaning catalyst, and also so as to resist against the severe vibrations while the automobile is running. The members of the honeycomb core body, i.e., the sheet-like band and the corrugated band are joined together at the areas of contact therebetween by one of various known manners.

However, this conventional arrangement cannot remain useful for a long period of time. For example, large separation between the outermost peripheral surface of the honeycomb core body and the inner surface of the metal casing tends to occur, in the direction of the axis of the honeycomb core body (i.e., in the exhaust gas flowing direction), due to the stress resulting from thermal strains under the above-mentioned severe thermal environments. Further, about the peripheral part (the outer peripheral surface and the portion immediately thereinside) of the honeycomb core body, the members (a sheet-like band and a corrugated band) of the honeycomb core body tend to be separated, cracked or otherwise broken to a large extent.

Attempts have been made to solve the foregoing problem, and it has turned out that to merely join the honeycomb core body and the metal casing together firmly is not successful.

SUMMARY OF THE INVENTION

It is therefore an object of this invention to provide an exhaust gas cleaning apparatus in which separation between the outermost peripheral surface of at least one honeycomb core body and the inner surface of a tubular metal casing as well as cracking or other breakage can be prevented for a long period of time without completely fixing the outer peripheral surface of the honeycomb core body to the inner surface of the metal casing.

According to a first aspect of this invention, there is provided an exhaust gas cleaning apparatus comprising: a single honeycomb core body adapted for carrying thereon an exhaust gas cleaning catalyst and composed of a sheet-like band made of a thin metal sheet and a corrugated band made from another thin metal sheet, the sheet-like band and the corrugated band being superposed one over the other so as to have areas of contact therebetween and so as to define many network-patterned gas flow passages along the central axis thereof; and a metal casing opening at opposite ends, the honeycomb core body being inserted in and fixed to the metal casing, the metal casing having an outer wall expandable and contractible axially so as to follow the stress due to a thermal expansion of the honeycomb core body.

According to a second aspect of this invention, there is provided an exhaust gas cleaning apparatus comprising: at least two honeycomb core bodies each adapted for carrying thereon an exhaust gas cleaning catalyst and composed of a sheet-like band made of a thin metal sheet and a corrugated band made from another thin metal sheet, the sheet-like band and the corrugated band being superposed one over the other so as to have areas of contact therebetween and so as to have areas of contact therebetween and so as to define many network-patterned gas flow passages along the central axis thereof; and a metal casing opening at opposite ends, the honeycomb core bodies being arranged in the metal casing, with at least one axial space between the honeycomb core bodies, and fixed to the metal casing, the metal casing having an outer wall expandable and contractible axially so as to follow the stress due to a thermal expansion of the individual honeycomb core bodies.

The above and other objects, features and additional advantages of this invention will become manifest to those versed in the art upon making reference to the detailed description and the accompanying drawings in which a variety of preferred structural embodiments incorporating the principle of this invention are shown by way of illustrative example.

DETAILED DESCRIPTION

Figure 1:
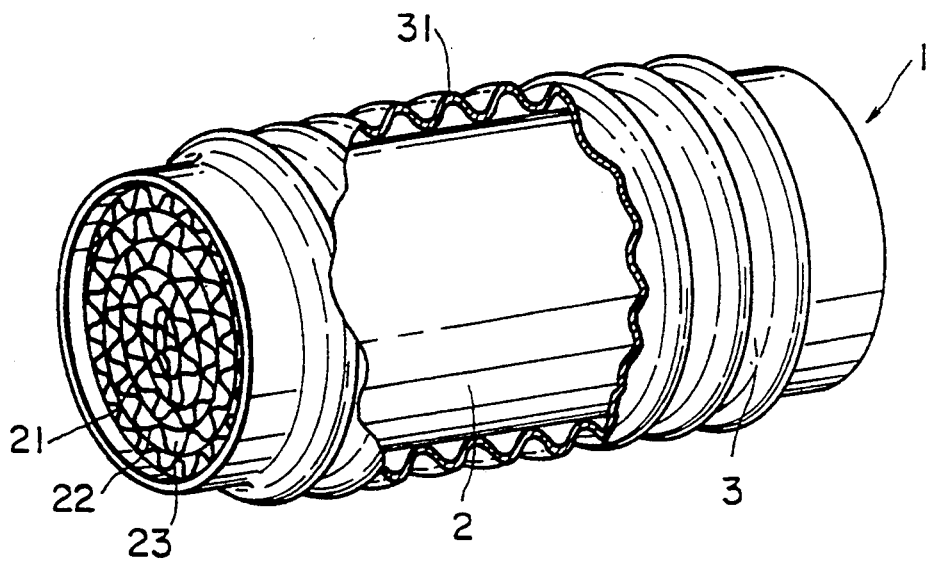
FIG. 1 is a perspective view, partially broken away, of an exhaust gas cleaning apparatus according to a first embodiment of this invention.

As discussed above, generally, in the manufacture of the conventional exhaust gas cleaning apparatus, a single honeycomb core body is inserted in a tubular metal casing opening at opposite ends, and then the outer peripheral surface of the honeycomb core body and the inner surface of the metal casing are fixed together firmly. However, such conventional cleaning apparatus could not be durable for long service.

Since exhaust gas cleaning apparatuses are to be used under severe thermal environments, the constituent members of the apparatus would be subjected to the large stress due to thermal strains, which is a primary cause to impair the durability.

Specifically, the constituent members of an exhaust gas cleaning apparatus are subjected to a large stress due to thermal strains resulting from the heat alternating load, i.e., the heating and cooling cycle (the cycle within the temperature range of from $-20$ to $900°$ C. at an exhaust system) depending upon whether the engine of an automobile is in operation or is stopped, whether the load is large or small, and so forth.

Also when the automobile is running, an exhaust gas cleaning apparatus is subjected to a large stress due to thermal strains. Partly due to the difference in distribution of exhaust gas flow (more flow at the central part than at the peripheral part), and partly due to the contact reaction (exothermic reaction) between exhaust gas and an exhaust gas cleaning catalyst (e.g., platinum, palladium, rhodium) carried on the surfaces of the honeycomb core body, the central part of the honeycomb core body is subjected to higher temperature than the peripheral part, which would be a cause for the thermal strains.

Further, the temperature gradient between the outermost peripheral surface of the honeycomb core body and the next outer portion inwardly contiguous thereto is remarkably large, compared to the temperature gradient around the central part. This tendency to separate is accelerated more and more as the honeycomb core body is fixed in the metal casing exposed to the outside air.

Resulting from this, the honeycomb core body and the metal casing tend to be separated along with time lapsing, even though the outermost peripheral surface of the honeycomb core body is fixed to the inner surface of the metal casing by brazing.

Likewise, by the stress due to the thermal strains, separation at the areas of contact between the sheet-like and corrugated bands making up the honeycomb core body tends to occur at the peripheral part between the outermost peripheral surface (of the honeycomb core body) brazed to the inner surface of the metal casing and the next outer portion contiguous thereto. When this separation begins, the members of the honeycomb core body, i.e., the sheet-like and corrugated bands would be cracked or otherwise broken as vibrations from the internal engine or the automobile body are added.

In order to retard or prevent this separation phenomenon, it is necessary to adopt some measure to relax the stress due to thermal strains at the outer peripheral part of the honeycomb core body.

For this purpose, this invention adopts the concept of using a tubular metal casing which can follow the large stress due to axial thermal strains created near the peripheral part of one or more honeycomb core bodies received in and fixed to the metal casing.

In this invention, means for following the stress due to axial thermal strains on the honeycomb core bodies inside the tubular metal casing should not be limited to a specific form. For example, the outer wall of the metal casing may be provided with waves of small pitches so as to be expandable and contractible. Namely, the expandable and contractible outer wall of the metal casing may be a wavy form in longitudinal cross section, with top and/or bottom portions of the wave form being arcuate. In an alternative form, the outer wall of the metal casing has a longitudinal cross-sectional shape of meanders including a succession of rough trapezoids.

In the manufacture of the cleaning apparatus, one or more honeycomb core bodies are received in and fixed to the expandable and contractible metal casing which is capable of absorbing and relaxing the stress due to thermal strains on the honeycomb core bodies. Alternatively, one or more honeycomb core bodies may first be inserted in a wave-free blank metal casing, and thereafter the metal casing may be shaped into a wavy form as viewed in longitudinal cross section.

After the honeycomb core bodies have been inserted in the expandable and contractible metal casing, each honeycomb core body and the metal casing are fixed together by one of various known manners. For example, the outer peripheral surface of each honeycomb core body and the inner surface of the expandable and contractible metal casing may be fixed at the entire area of contact therebetween such as by brazing. Alternatively, the outer peripheral surface of each honeycomb core body and the inner surface of the metal casing may be fixed only at part of the entire area of contact in order to improve absorption and relaxation of the thermal strains acting on portions near the outer peripheral surface of the individual honeycomb core body, i.e., between the outer peripheral surface of the honeycomb core body and the inner surface of the, metal casing. For example, the outer peripheral surface of the single honeycomb core body may be fixed only at one end portion or a central portion thereof; or the outer peripheral surface of each of two or more honeycomb core bodies may be joined at a marginal portion near the axial space between the adjacent honeycomb core bodies. With this arrangement, the honeycomb core body or bodies can be expanded and contracted independently of the metal casing within a widened range.

According to the exhaust gas cleaning apparatus thus constructed, since the outer wall of the metal casing outside the honeycomb core bodies is axially expandable and contractible so as to follow the stress due to thermal strains acting on the honeycomb core bodies inside, it is possible to effectively absorb and relax the large stress due to the thermal strains acting especially near the outer peripheral surface of the individual honeycomb core body, thus causing remarkably improved durability.

In this invention, the individual honeycomb core body of a desired structure may be used. For production of the honeycomb core body, for example, a sheet-like and a corrugated band made from thin metal sheets are superposed one over the other so as to have areas of contact therebetween, and then are rolled together into a spiral form, or laminated in layers. Also, the metal casing of a desired shape may be used. For example, the metal casing may have a circular or racing-track-shaped cross section.

To sum up, according to exhaust gas cleaning apparatus of this invention, since the metal casing has an outer wall axially expandable and contractible so as to follow the stress due to the thermal strains acting on the individual honeycomb core bodies inside, it is possible to offer the following advantageous results:

(i) The areas of contact between the inner surface of the metal casing and the outer peripheral surface of the honeycomb core body remain fixed for a long period of time. That is, since the expandable and contractible outer wall of the metal casing effectively absorbs and relaxes the stress due to thermal strains on the honeycomb core body, particularly the large stress created near the outer peripheral surface of the honeycomb core body, the honeycomb core body and the metal casing can be kept for a long period of time from separation. As separation between these two parts is prevented, it is possible to retard or prevent cracking or other breakage of the outer peripheral surface of the individual honeycomb core body, thus improving the durability and vibration resistance remarkably.

This result would be encouraged if two or more honeycomb core bodies are fixed, with an axial space between adjacent core bodies, in the metal casing. Further, the same result would be accelerated more and more if the outer peripheral surface of the individual honeycomb core body is fixed to the inner surface of the metal casing, with axial part of the areas of contact therebetween being left non-fixed, so that the individual honeycomb core bodies inside the metal casing can be expanded and contracted.

(ii) Since the stress due to thermal strains on the outer peripheral surface of the honeycomb core body is absorbed by the expandable and contractible outer wall of the metal casing, the large stress created in a concentrated or one-sided fashion near the outer peripheral surface of the honeycomb core body, namely, between the outer peripheral surface of the honeycomb core body and the part immediately inside the outer peripheral surface of the honeycomb core body. Consequently, separation at the areas of contact between the sheet-like and/or corrugated bands making up the honeycomb core body as well as cracking or other breakage of these members can be retarded or prevented.

(iii) If two or more honeycomb core bodies are used, since there is provided at least one axial space between the adjacent core bodies, it is possible to create a turbulent flow of exhaust gas at the axial space. This turbulent exhaust gas flow causes the exhaust gas to be cleaned uniformly. Further, the high-temperature exhaust gas at the central part of the individual honeycomb core body is drawn also to the peripheral part of the same honeycomb core body, a uniform distribution of temperature in the exhaust gas cleaning apparatus can be achieved. Accordingly, it is possible to avoid the on-sided stress due to thermal expansion, thus improving the durability of the exhaust gas cleaning apparatus.

This invention will now be described in greater detail by the following embodiments with reference to the accompanying drawings; however, this invention should by no means be limited to these specific forms.

Figure 2:
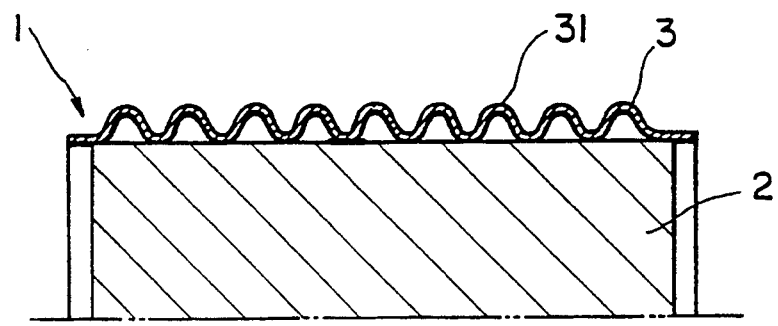
FIG. 2 is a fragmentary longitudinal cross-sectional view of the apparatus of FIG. 1.

(I) FIGS. 1 and 2 illustrate an exhaust gas cleaning apparatus according to a first embodiment of this invention; FIG. 1 is a perspective view, partially broken away, of the cleaning apparatus, and FIG. 2 is a fragmentary longitudinal cross-sectional view of the cleaning apparatus.

In the manufacture of the exhaust gas cleaning apparatus 1 of this invention, a single honeycomb core body 2 is inserted in and fixed, by brazing, to a tubular metal casing 3 opening at opposite ends. The metal casing 3 has an outer wall 31 which is axially expandable and contractible to follow the stress due to thermal strains on the honeycomb core body 2 inside. In this embodiment, the expandable and contractible outer wall 31 of the metal casing 3 has a sine wave-shaped longitudinal cross section. Alternatively, the cross-sectional shape of the outer wall 31 is not limited to this sine wave shape, as described below.

For the production of the honeycomb core body 2, a sheet-like band 21 made of a heat-resistant thin steel sheet and a corrugated band 22 made from a thin steel sheet of the same kind are superposed one over the other so as to have areas of contact therebetween, and then are rolled together into a spiral form defining many network-patterned exhaust gas flow passages 23 which allow exhaust gas to flow therethrough.

A heat-resistant steel sheet containing 20% by weight of chromium and 5% by weight of aluminum and having a thickness of 0.04 mm and a width of 75 mm was used as a sheet-like band 21. Meanwhile, another steel sheet of the same kind as the sheet-like band 21 was shaped into a wavy form, and the resulting wavy sheet was used as a corrugated band 22.

Figure 3:
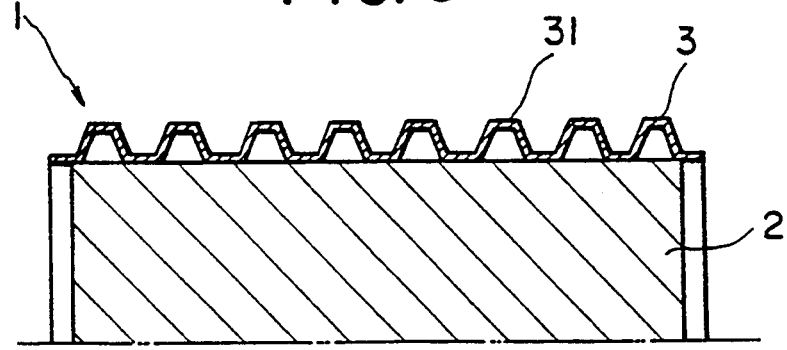
FIG. 3 is a view similar to FIG. 2, showing a second embodiment.

(II) FIG. 3 illustrates a modified exhaust gas cleaning apparatus according to a second embodiment of this invention. In this modified cleaning apparatus, unlike the first embodiment, the expandable and contractible outer wall 31 of the tubular metal casing 3 has a longitudinal cross-section shape of meanders including a succession of rough trapezoids.

Figure 4:
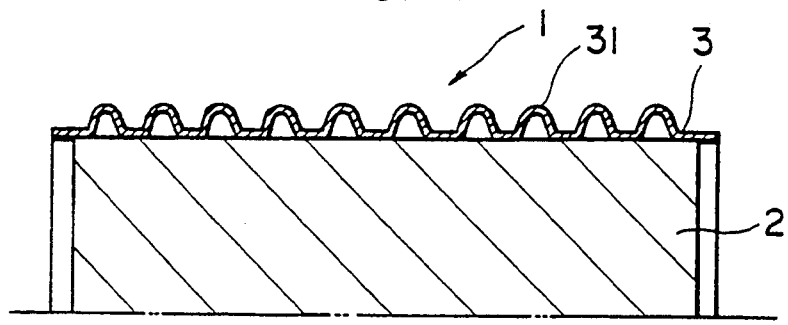
FIG. 4 is a view similar to FIGS. 2 and 3, showing a third embodiment.

(III) FIG. 4 illustrates a third embodiment, in which the expandable and contractible outer wall 31 of the tubular metal casing 3 has a wavy longitudinal cross section, with only top portions of the wave form being arcuate.

Figure 5:
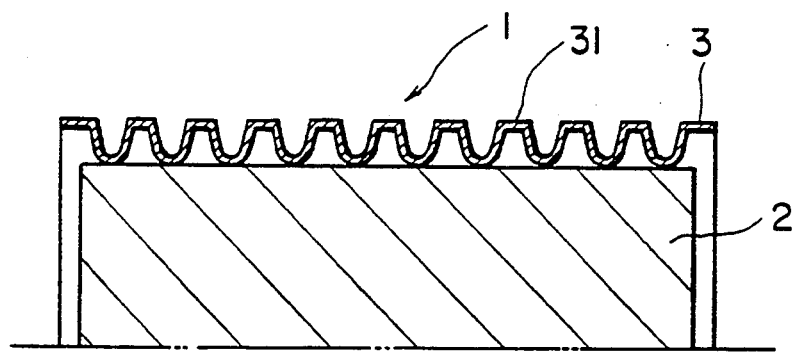
FIG. 5 is a view similar to FIG. 4, showing a fourth embodiment.

(IV) FIG. 5 illustrates a fourth embodiment, in which the expandable and contractible outer wall 31 of the tubular metal casing 3 has a wavy longitudinal cross section, with only bottom portions of the wave form being arcuate (inversely to the third embodiment).

Figure 6:
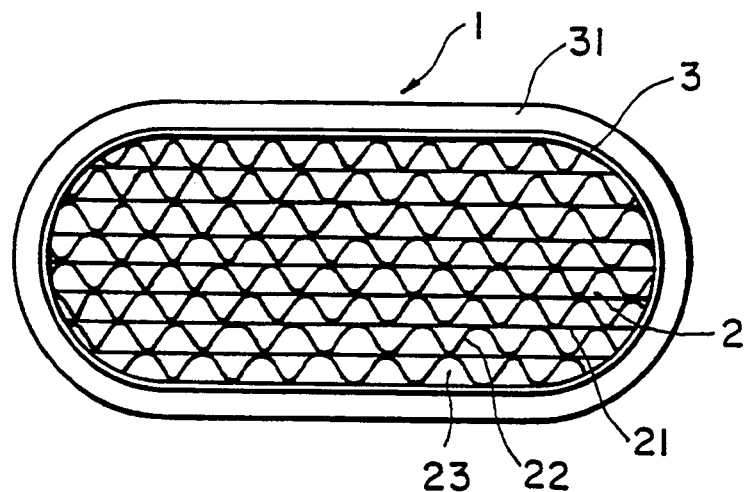
FIG. 6 is a front view of a modified exhaust gas cleaning apparatus according to a fifth embodiment.

(V) FIG. 6 illustrates a fifth embodiment, in which the sheet-like and corrugated bands 21, 22 of the honeycomb core body 2 are laminated in layers and in which the tubular metal casing 3 having the expandable and contractible outer wall 31 has a racing-track-shaped cross section.

Figure 7:
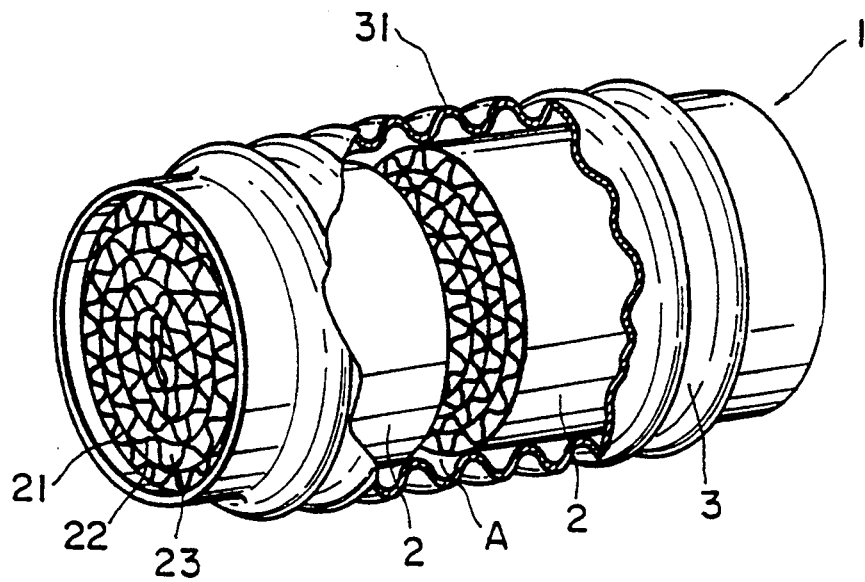
FIG. 7 is a view similar to FIG. 1, showing a sixth embodiment.
Figure 8:
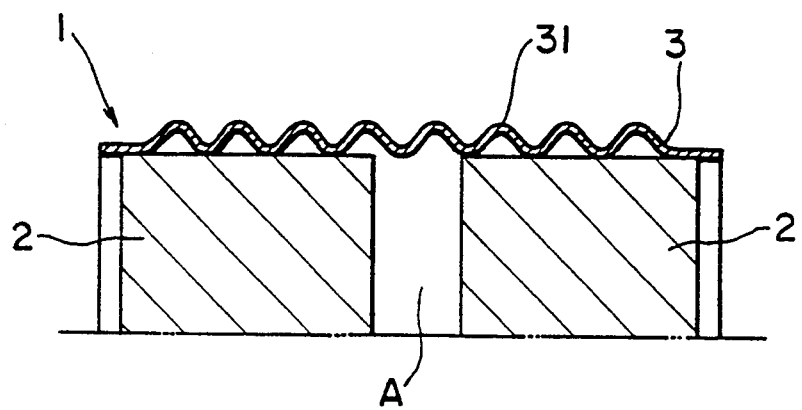
FIG. 8 is a fragmentary longitudinal cross-sectional view of the apparatus of FIG. 7.

(VI) FIGS. 7 and 8 illustrate a modified exhaust gas cleaning apparatus according to a sixth embodiment of this invention; FIG. 7 is a perspective view, partially broken away, of the cleaning apparatus, and FIG. 8 is a fragmentary longitudinal cross-sectional view of the same apparatus.

In the manufacture of the exhaust gas cleaning apparatus 1 of this invention, two honeycomb core bodies 2, 2 are arranged, with an axial space (A) therebetween, in a single tubular metal casing 3 opening at opposite ends, and is fixed to the metal casing 3. The outer wall 31 of the tubular metal casing 3, like that of the foregoing embodiments, is axially expandable and contractible so as to follow the stress due to thermal expansion of the individual honeycomb core bodies 2, 2 inside. The outer peripheral surface of the individual honeycomb core body 2 is fixed, by brazing, to the inner surface of the tubular metal casing 3 axially at the part of the areas of contact therebetween near one of the opposite open ends of the metal casing 3 and also circumferentially around the outer peripheral surface of the individual honeycomb core body 2. With this arrangement, non-fixed part of the individual honeycomb core body 2 is allowed to be expanded and contracted axially.

A heat-resistant steel sheet containing 20% by weight of chromium and 5% by weight of aluminum and having a thickness 0.05 mm and a width of 30 mm was used as a sheet-like band 21. Meanwhile, another steel sheet of the same kind as the sheet-like band 21 was shaped into a wavy form, and the resulting wavy sheet was used as a corrugated band 22. In this embodiment, two sets of these sheet-like and corrugated bands 21, 22 were rolled together, each set into a spiral form, to thus provide two identical honeycomb core bodies 2, 2.

Figure 9:
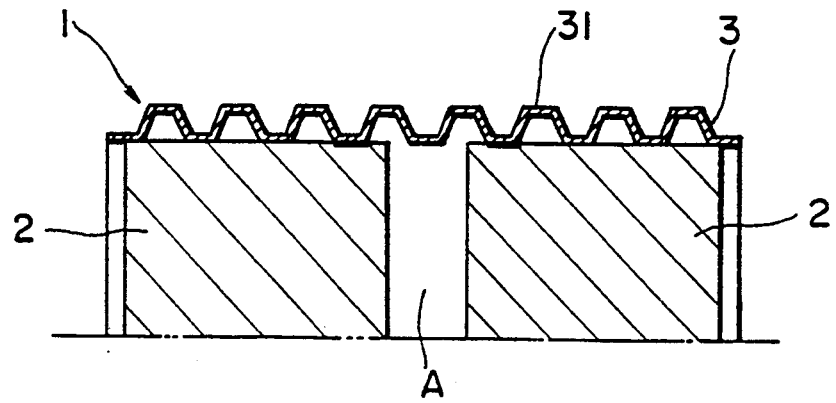
FIG. 9 is a view similar to FIG. 8, showing a seventh embodiment.

(VII) FIG. 9 illustrates a seventh embodiment. In this embodiment, unlike the sixth embodiment, the expandable and contractible outer wall 31 of the tubular metal casing 3 has a longitudinal cross-sectional shape of meanders including a succession of rough trapezoids, and the individual honeycomb core body 2 is fixed, by brazing, at a plurality of circumferential portions near the central part of the core body 2.

What is claimed is:

1. An exhaust gas cleaning apparatus comprising: a single honeycomb core body carrying thereon an exhaust gas cleaning catalyst and composed of a sheet band made of a thin metal sheet and a corrugated band made from another thin metal sheet, said sheet band and said corrugated band being superposed one over another so as to have areas of contact therebetween and so as to define many network-patterned gas flow passages along a central longitudinal axis thereof; and a metal casing having a central axis and being opened at opposite ends, said honeycomb core body being inserted in and fixed directly to said metal casing, said metal casing having an outer wall expandable and contractible axially so as to follow stress due to a thermal expansion of said honeycomb core body.

2. An exhaust gas cleaning apparatus according to claim 1, wherein said outer wall of said metal casing is a wavy form in longitudinal cross section and includes arcuate portions.

3. An exhaust gas cleaning apparatus according to claim 1, wherein said outer wall of said metal casing has a longitudinal cross-sectional shape of meanders including a succession of rough trapezoids.

4. An exhaust gas cleaning apparatus according to claim 1, wherein said sheet and corrugated bands of said honeycomb core body are rolled together into a spiral form.

5. An exhaust gas cleaning apparatus according to claim 1, wherein said sheet and corrugated bands of said honeycomb core body are laminated in layers.

6. An exhaust gas cleaning apparatus according to claim 1, wherein said metal casing has a circular cross section.

7. An exhaust gas cleaning apparatus according to claim 1, wherein said metal casing has a racing-track-shaped cross section.

8. An exhaust gas cleaning apparatus according to claim 1, wherein an outer peripheral surface of said honeycomb core body is fixed to an inner surface of said metal casing at at least one part axially.

9. An exhaust gas cleaning apparatus according to claim 2, wherein an outer peripheral surface of said honeycomb core body is fixed to an inner surface of said metal casing at at least one part axially.

10. An exhaust gas cleaning apparatus according to claim 3, wherein an outer peripheral surface of said honeycomb core body is fixed to an inner surface of said metal casing at at least one part axially.

11. An exhaust gas cleaning apparatus according to claim 8, wherein said outer peripheral surface of said honeycomb core body is fixed to said inner surface of said metal casing at at least one part axially and around said honeycomb core body circumferentially.

12. An exhaust gas cleaning apparatus comprising: at least two honeycomb core bodies each carrying thereon an exhaust gas cleaning catalyst and composed of a sheet band made of a thin metal sheet and a corrugated band made from another thin metal sheet, said sheet band and said corrugated band being superposed one over another so as to have areas of contact therebetween and so as to define many network-patterned gas flow passages along a central longitudinal axis thereof; and a metal casing having a central axis and being opened at opposite ends, said at least two honeycomb core bodies being arranged in said metal casing, with at least one axial space between said at least two honeycomb core bodies, and fixed directly to said metal casing, said metal casing having an outer wall expandable and contractible axially so as to follow stress due to a thermal expansion of said at least two individual honeycomb core bodies.

13. An exhaust gas cleaning apparatus according to claim 12, wherein said outer wall of said metal casing is a wavy form in longitudinal cross section and includes arcuate portions.

14. An exhaust gas cleaning apparatus according to claim 12, wherein said outer wall of said metal casing has a longitudinal cross-sectional shape of meanders including a succession of rough trapezoids.

15. An exhaust gas cleaning apparatus according to claim 12, wherein said sheet and corrugated bands of each of said at least two honeycomb core bodies are rolled together into a spiral form.

16. An exhaust gas cleaning apparatus according to claim 12, wherein said sheet and corrugated bands of each of said at least two honeycomb core bodies are laminated in layers.

17. An exhaust gas cleaning apparatus according to claim 12, wherein said metal casing has a circular cross section.

18. An exhaust gas cleaning apparatus according to claim 12, wherein said metal casing has a racing-track-shaped cross section.

19. An exhaust gas cleaning apparatus according to claim 12, wherein an outer peripheral surface of each of said at least two honeycomb core bodies is fixed to an inner surface of said metal casing at at least one part axially.

20. An exhaust gas cleaning apparatus according to claim 13, wherein an outer peripheral surface of each of said at least two honeycomb core bodies is fixed to an inner surface of said metal casing at at least one part axially.

21. An exhaust gas cleaning apparatus according to claim 14, wherein an outer peripheral surface of each of said at least two honeycomb core bodies is fixed to an inner surface of said metal casing at at least one part axially.

22. An exhaust gas cleaning apparatus according to claim 21, wherein an outer peripheral surface of each of said at least two honeycomb core bodies is fixed to an inner surface of said metal casing at at least one part axially and around each said honeycomb core body circumferentially.

* * * * *